(12) United States Patent
Neiburger et al.

(10) Patent No.: US 8,752,408 B2
(45) Date of Patent: Jun. 17, 2014

(54) BRAKE PEDAL DEPRESSING DEVICE AND METHOD OF USING THE SAME

(75) Inventors: Thomas W. Neiburger, Tucson, AZ (US); Bret Lee Niemeyer, Tucson, AZ (US)

(73) Assignee: TWN Enterprises, LLC, Tucson, AZ (US)

( * ) Notice: Subject to any disclaimer, the term of this patent is extended or adjusted under 35 U.S.C. 154(b) by 116 days.

(21) Appl. No.: 13/149,740

(22) Filed: May 31, 2011

(65) Prior Publication Data

US 2012/0047706 A1 Mar. 1, 2012

Related U.S. Application Data

(60) Provisional application No. 61/377,961, filed on Aug. 29, 2010.

(51) Int. Cl.
*B60R 25/08* (2006.01)

(52) U.S. Cl.
USPC .................. 70/201; 70/238; 70/254

(58) Field of Classification Search
USPC ........... 70/199, 201, 202, 209, 211, 225, 226, 70/227, 237, 238, 254
See application file for complete search history.

(56) References Cited

U.S. PATENT DOCUMENTS

| | | | | |
|---|---|---|---|---|
| 4,959,981 A | * | 10/1990 | Davidson | 70/238 |
| 5,259,222 A | * | 11/1993 | Jang | 70/209 |
| 5,345,796 A | * | 9/1994 | Chieh et al. | 70/202 |
| 5,583,288 A | | 12/1996 | Brenner et al. | |
| 5,704,233 A | * | 1/1998 | Farshad | 70/238 |
| 5,724,838 A | * | 3/1998 | Alicea | 70/199 |
| 5,765,416 A | * | 6/1998 | Cote | 70/238 |
| 5,911,391 A | * | 6/1999 | Russ et al. | 70/200 |
| 6,029,483 A | * | 2/2000 | Daniels | 70/199 |
| 6,058,749 A | * | 5/2000 | Rekemeyer | 70/226 |
| 7,412,859 B2 | * | 8/2008 | Lycoudis | 70/202 |
| 2008/0148792 A1 | * | 6/2008 | Davis | 70/238 |

* cited by examiner

*Primary Examiner* — Christopher Boswell
(74) *Attorney, Agent, or Firm* — Yakov Sidorin; Quarles & Brady LLP

(57) ABSTRACT

A system and method for restraining a vehicular brake pedal in depressed position. A system includes an elongated multi-section unit the length of which can be adjusted within a dynamic range by changing mutual positioning of the sections and locking the unit with an internal lock once the desired length has been achieved. Fastening of the internal lock is achieved through twisting of the unit around its axis. The restraining of the brake pedal is carried out with respect to a steering wheel, a portion of which is received and accommodated by a cradle on one end of the unit while a turnable foot on the other end of the system depresses the pedal.

17 Claims, 14 Drawing Sheets

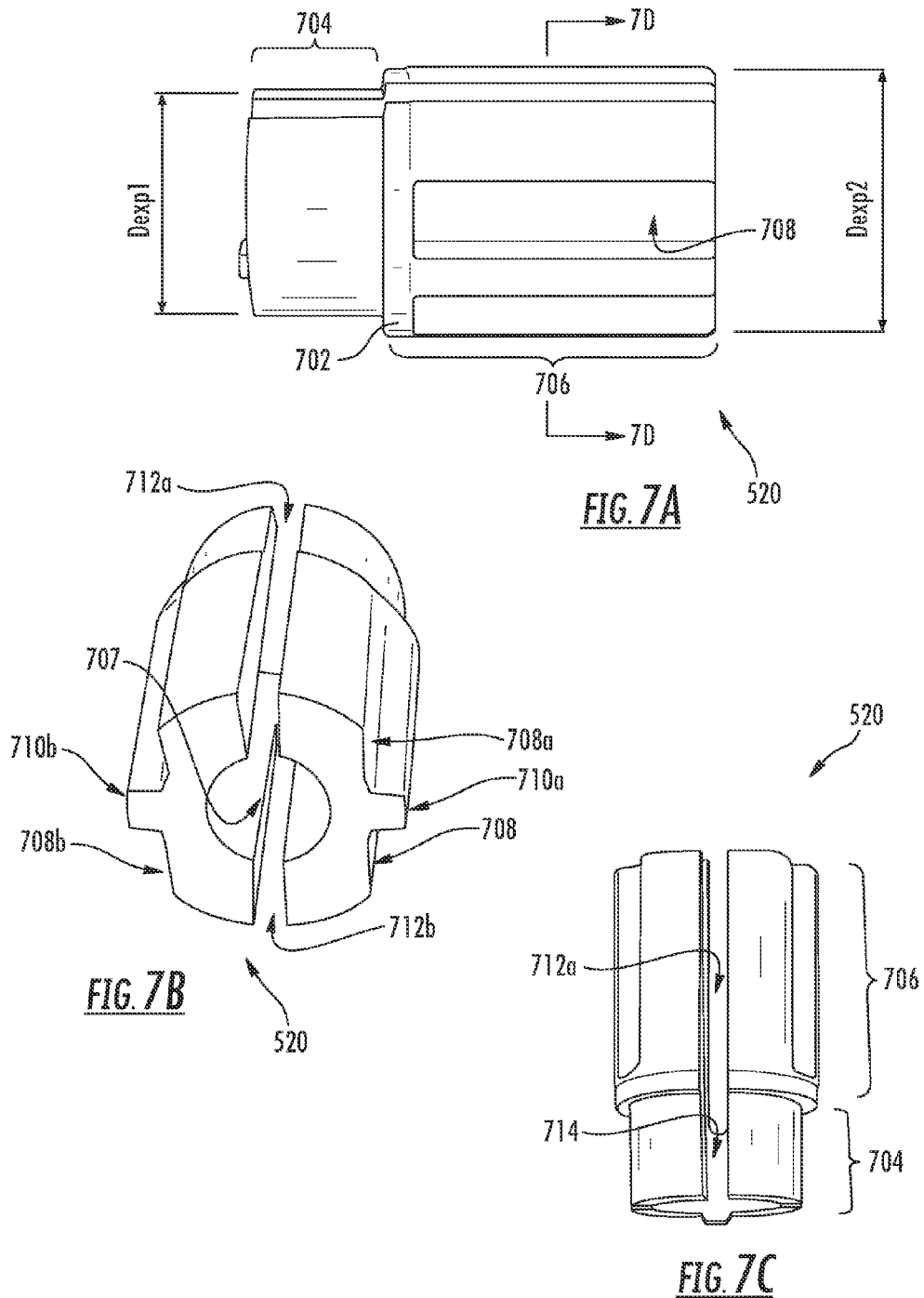

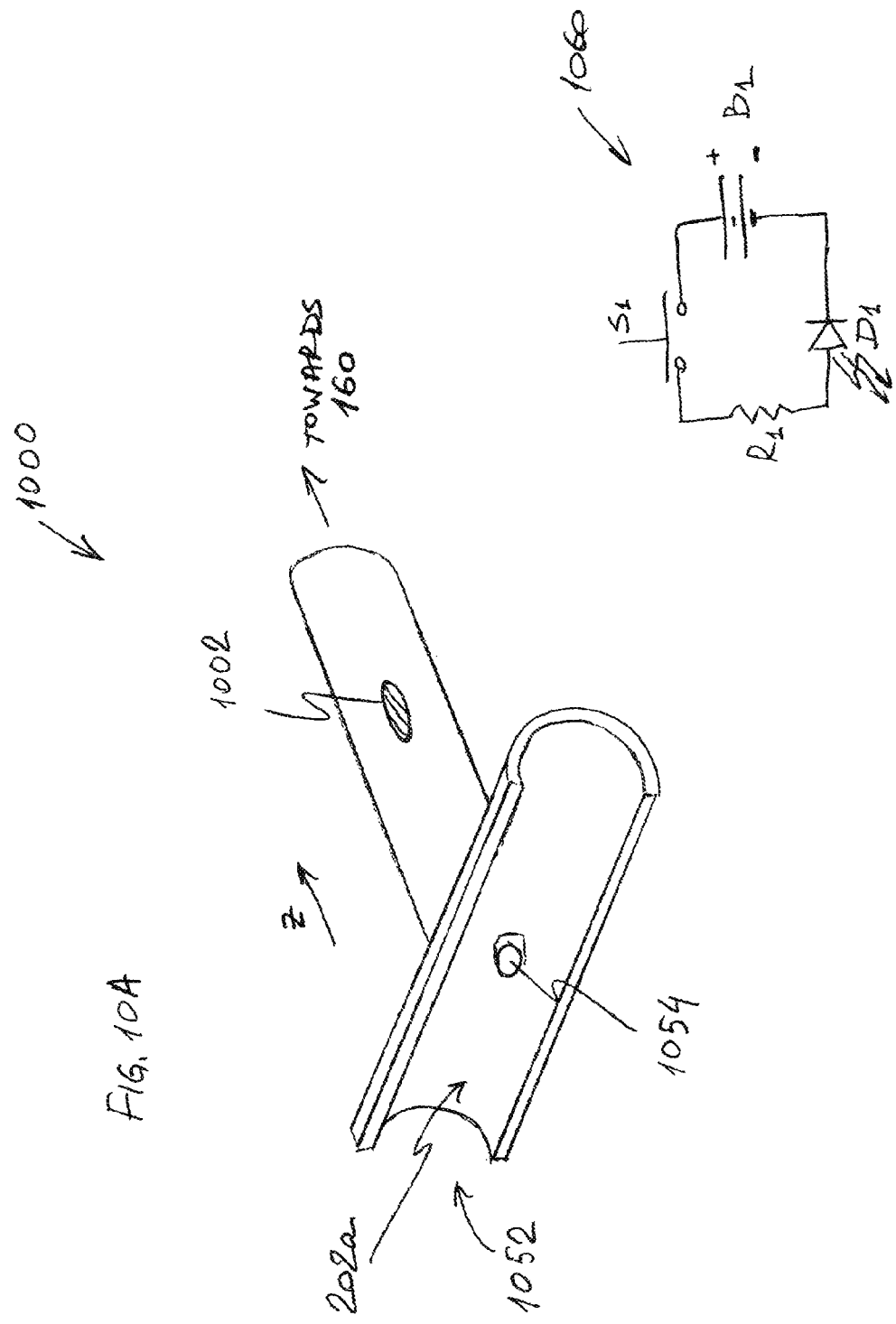

BRAKE PEDAL DEPRESSING DEVICE AND METHOD OF USING THE SAME

CROSS-REFERENCE TO RELATED APPLICATIONS

This patent application claims benefit and priority from U.S. Provisional Patent Application No. 61/377,961 filed on Aug. 29, 2010 and titled "Brake Pedal Depressing Device and Method of Using the Same." The disclosure of the above-mention patent application is incorporated herein by reference in its entirety.

TECHNICAL FIELD

The present invention relates to the field of automotive inspections and, more particularly, to inspection of vehicular brakes.

BACKGROUND ART

Federal Motor Carrier Safety Administration and Department of Transportation requires periodic inspection of the vehicular brakes on all commercial vehicles (in particular, both pre- and post-transportation trip). Conventional practice of confirming that a vehicular brake system is operational is for one person to depress the brake pedal in the cabin of the vehicle while another person, standing behind the vehicle, verifies that the brake lights are operational and that air pressure is at appropriate level within the brake system. While this approach is widely used, it requires the presence of two people. In practice, however, there is often only a single driver going on a road-trip. A single person finds it rather difficult to check the performance of the brakes.

As an "on-the-spot" solution, many drivers use some sort of an irregular, circumstantial article (such as a brick or a stick, for example) that they could accommodate on the brake pedal to depress it while stepping out of the vehicle to see whether the brakes lights are lit. (Validation of the operability of the brake system on some vehicles also often includes a verification that the air-pressure system engaging the brakes maintains the appropriate pressure, and that no air-leaks are present. In practice, this is done "by ear", when a driver listens to the noisy air-leaks outside of the vehicle while the brake pedal is depressed.) In practice, such "on-the-spot" solution is neither optimal nor versatile because, on one hand, an irregular article cannot be reliably fastened to and depress the brake pedal for a time period necessary to conclude the inspection and, on the other hand, the same irregular article cannot be used in every vehicle due to difference in dimensions of vehicular cabins and/or different resistance of different brake pedals. In particular, solutions offering depressing a brake pedal by "wedging" an elongated element such as a stick, tube, or rod between either the driver's seat and the brake pedal or a dash board and the brake pedal do not take into account the design of the vehicular cabin. Indeed, it is well known the fact that there exists no uniformity in design of either the vehicular seats or dash boards, which makes it problematic to accommodate different distances between the seat/board and brake pedal. For example, dash boards are universally different from model to model of a vehicle. Moreover, some vehicles are lacking a dash-board surface that could provide for similar accommodation. As far as using a driver seat is concerned, not only is it soft but, in practice, many driver seats are worn out or torn apart and simply do not provide a solid reference surface for entrapping or fixing one of the ends of a wedging element.

In another approach to solve the problem, an external vehicular mirror may be affixed to a back portion of the vehicle and oriented to make a rear brake light visible to the driver sitting in the cabin. This solution, of course, requires a mirror that is appropriately attached and fully operational at the time of inspection. More often than desired, however, such protruding beyond the extend of the vehicle mirror is out of working order, for example broken off. There is a need, therefore, in a universal tool and method that secures or fixes a depressed position of the brake pedal thereby facilitating the inspection, by a single person (driver), of a brake system of any vehicle and that does not depend on availability of auxiliary components located externally to the vehicle.

SUMMARY OF THE INVENTION

Embodiments of the present invention provide a system and a method for restraining a vehicular brake pedal in a depressed position with respect to a steering wheel thereby fixing a mutual orientation of the steering wheel and brake pedal. A system includes tubular sections configured to longitudinally slide with respect to one another so as to form a unit of adjustable length. In one embodiment, the length of the unit may be adjusted telescopically. A system additionally includes a cradle, having a channel, that is attached to one of the tubular sections so as to have the extent directed at a predetermined angle with respect to the adjustable length. In a related embodiment, the cradle may be defined by a plurality of forks formed by branches on the corresponding tubular section. A system may additionally include a support attached to another tubular section through a turnably or rotatably adjustable joint, which is disposed at the opposite end of the unit with respect to the cradle. In a specific embodiment, the tubular sections of the system may be adjoining and the cradle can be repositioned with respect to the tubular section to which it is attached. The cradle is configured to receive and accept a steering wheel while the foot is depressing the brake pedal after an embodiment of the system has been inserted between the steering wheel and the brake pedal.

Additionally, at least one of the tubular sections of an embodiment may have an associated lock moveably affixed to the end of the corresponding section. The lock is configured to facilitate the adjustment of the length of the embodiment by fitting inside an adjacent tubular section of the embodiment and expanding and/or changing its shape during the operation of the system thereby restraining mutual positioning of the adjacent tubular sections. The attachment of the lock to the respective tubular section may be configured with the use of a threaded system at the end of the tubular section.

In a specific embodiment, the system may additionally include a feedback system generating an output such as a optical signal or an audible signal perceived by the user when the system is appropriately set in place to depress the brake pedal. The feedback system is activated with a trigger that is preferably incorporated within the cradle.

Embodiments of a method of the invention include adjusting a length of an elongated unit that includes a plurality of sections having linear extent, an angularly turnable foot attached to one of the section, and a cradle transversely attached to one of the sections from the plurality of sections. An embodiment can further include inserting the elongated unit between the steering wheel and the brake pedal such that the transverse cradle receives a portion of the steering wheel while the foot depresses the brake pedal. Additionally, the method may include causing a feedback system of the unit to generate an output, whether an optical output or an audible output perceived by the user, in response to the cradle having received a portion of the steering wheel. Insertion of the unit may include twisting of the unit around an axis of the unit thereby unlocking at least one lock disposed within an at least one section of the unit. The unlocking of a lock facilitates the adjustment of the length of the unit by permitting the sections to slide with respect one another. In a specific embodiment, the sliding and length adjustment may occur telescopically and cause the unit to reach an extant exceeding a shortest distance between depressed brake pedal and the steering wheel.

BRIEF DESCRIPTION OF THE DRAWINGS

The invention will be more fully understood by referring to the following Detailed Description of Specific Embodiments in conjunction with the Drawings, of which:

FIGS. 1(A, B) show embodiments of the present invention.

FIGS. 2(A-D) illustrate a top portion of an embodiment of the invention.

FIGS. 10(A, B) schematically illustrate an implementation of the optical feedback system for use with an embodiment of the invention.

DETAILED DESCRIPTION OF SPECIFIC EMBODIMENTS

Figure 1A:
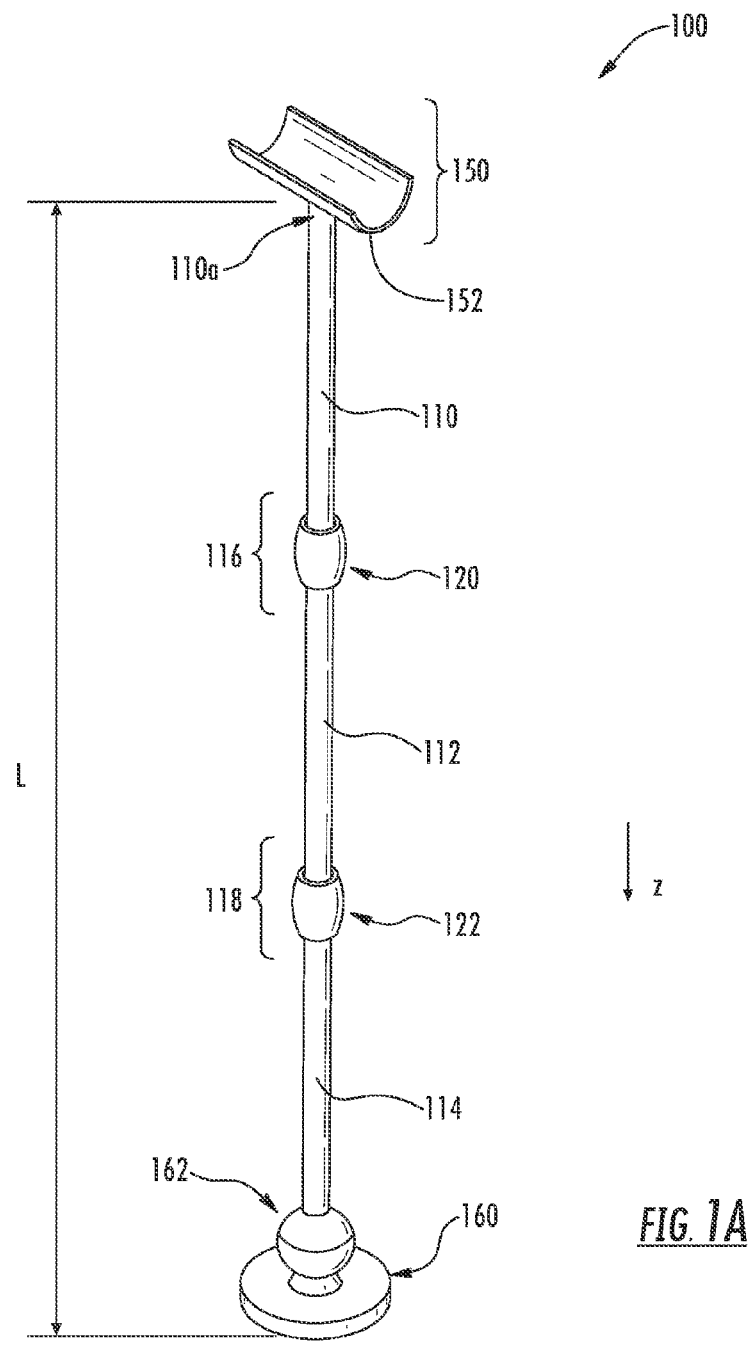
FIG. 1A: a perspective view of an embodiment including three tubular sections.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and/or in reference to a figure, is intended to provide a complete description of all features of the invention.

In addition, in drawings, with reference to which the following disclosure may describe features of the invention, like numbers represent the same or similar elements wherever possible. In the drawings, the depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view in order to simplify the given drawing and the discussion, and to direct the discussion to particular elements that are featured in this drawing.

A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described features, structures, or characteristics of the invention may be combined in any suitable manner in one or more embodiments. The invention as recited in claims appended to this disclosure is intended to be assessed in light of the disclosure as a whole.

In accordance with embodiments of the present invention, methods and apparatus are disclosed for checking the operational status of a vehicle. The present invention recognizes that the only element within a cabin of a vehicle that provides a constant, across automotive industry, spatial reference with respect to a brake pedal is a steering wheel, which offers a resilient, fixedly located reference surface with respect to which a position of the brake pedal may be reliably and quantifiably changed. Indeed, regardless of the model of the vehicle and a cabin design, the only variable describing the mutual relationship between the brake pedal and the steering wheel is a distance between them. Accordingly, embodiments of the present invention take advantage of this mutual relationship for fixing a position of the vehicular brake pedal in reference to the steering wheel.

Figure 1B:
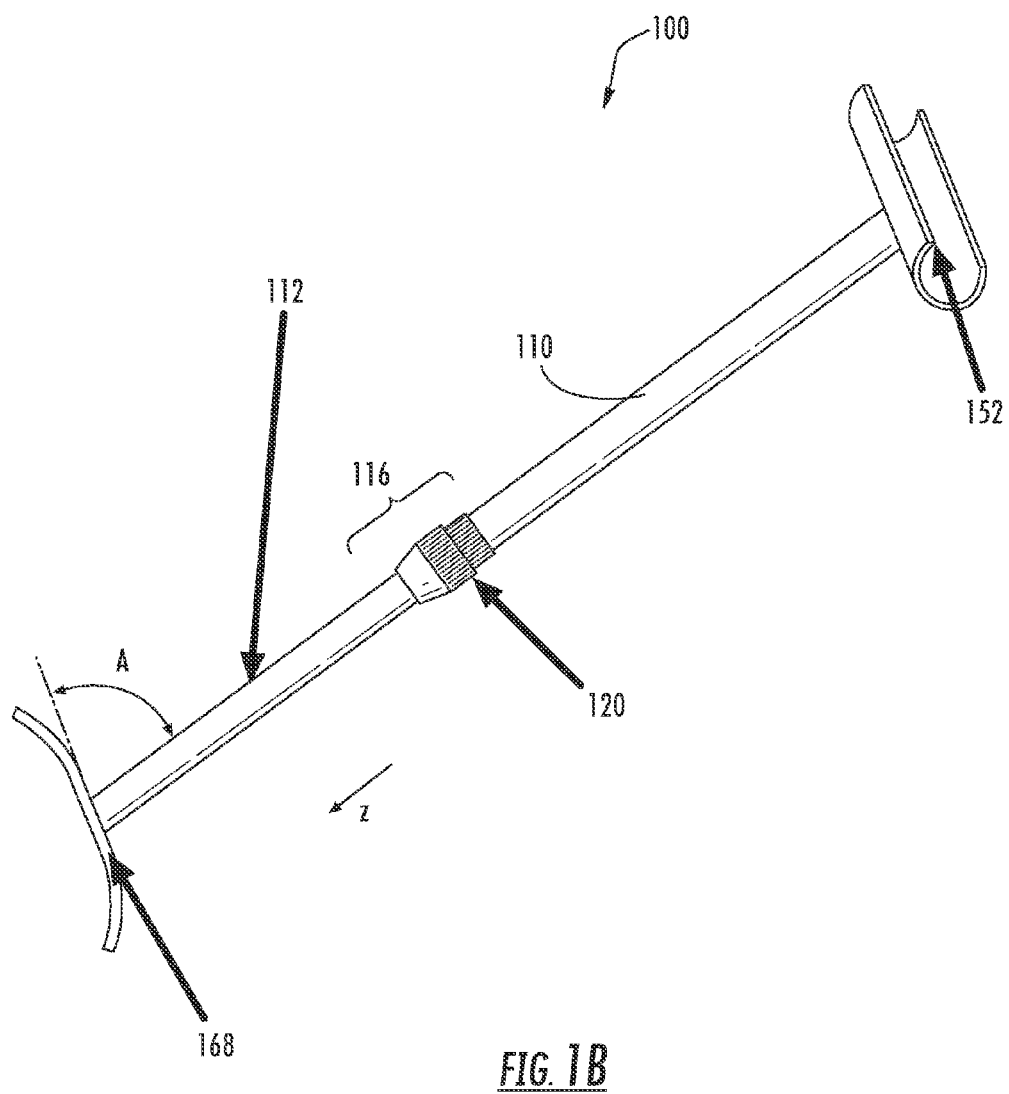
FIG. 1B: a side view of an embodiment including two tubular sections.

With reference to FIGS. 1A and 1B, FIG. 1A shows a perspective view of a brake-check device 100 of the present invention in its extended position. The device 100 includes elongated, preferably metallic and hollow, bodies or sections 110, 112, 114 such as, for example, tubes that are disposed coaxially with respect to one another and are mutually connected in a longitudinally-sequential and telescopic configuration. The chosen configuration allows the top section 110 to be slidably moved, in operation, in and out of and be received by the middle section 112. Similarly, the sections 112, 114 are telescopically configured to allow the bottom section 114 to receive the middle section 112 in a slidable fashion. It is appreciated that a particular order in which these hollow sections are configured to be telescopically movable between the extended and the refracted positions may vary. For example, in one alternative embodiment, the bottom section 114 may be slidably received by and within the middle section 112, and the middle section 112 may, in turn, be slidably received by and within the top section 110. In another alternative embodiment the middle section 112 may receive both of the section 110 and 114 inside the middle section 112. It is understood that, in a specific embodiment the device 100 may include a different number of tubular sections. FIG. 1B, for example, depicts an embodiment 100' having only two tubes 110, 112. Embodiments of the present invention are generally configured to telescopically vary the overall length of the brake-check device 100 between about 15 inches (in a fully collapsed, refracted position) and about 35 inches (in a fully protracted, expanded position) to provide not only for reliable cooperation with a brake pedal and a dash board of any vehicle but also for comfortable storage behind the driver's seat and/or within the glove compartment.

Joint portions 116, 118 of the device 100, which are defined by open ends of the tubular sections 110, 112, 114, are complemented with corresponding tubular joint covers 120, 122 configured around the joint portions and constructed from a resilient material. Generally, each of the joint covers 120 and 122 is co-axially placed over an end of a corresponding tubular section of the brake-check device so as to partially cover such end and axially rotatable around an axis of a corresponding tubular section within a pre-defined angular range. Each of the joint covers 120, 122 is appropriately configured to embracingly accommodate the outer surface of the respectively corresponding section 110, 112 within the hollow of the joint cover. In a preferred embodiment, joint covers 120, 122 have short hollow cylindrical bodies.

In reference to FIGS. 1(A, B) and FIGS. 2(A,B), a top end 150 of the embodiments 100, 100' includes a steering-wheel cradle 152 preferably made of resilient polymeric material. The steering-wheel cradle 152 is configured as a handle 202 that has preferably a shape of an incomplete cylinder (for example, a semi-cylindrical shape) and is supported by a foundation portion 204 that is either fabricated integrally with the handle 202 (for example, co-molded) or is made as a separate part and later appropriately affixed to the handle 202. In the embodiment shown in FIGS. 2(A,B), the handle 202 is shown to be shaped as a channel having a curved (for example, arced or semicircular) cross-section with an internal curved surface 202a. In one embodiment, the surface 202a is cylindrical with a radius R that is sufficiently large to accommodate, in a bracketing fashion, a section of the steering wheel as discussed below. In another embodiment (not shown), the handle 202 can be shaped as a part of a hollow torus.

Figure 2A:
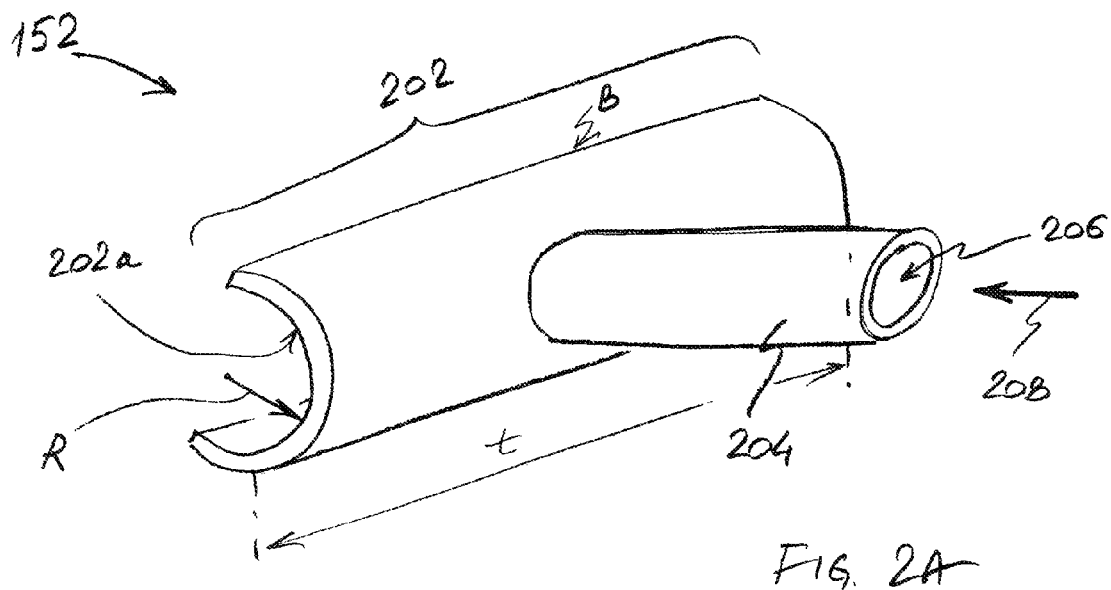
FIG. 2A shows an embodiment of a steering-wheel cradle component configured for attachment to the top tubular portion of an embodiment via tight fit.
Figure 2B:
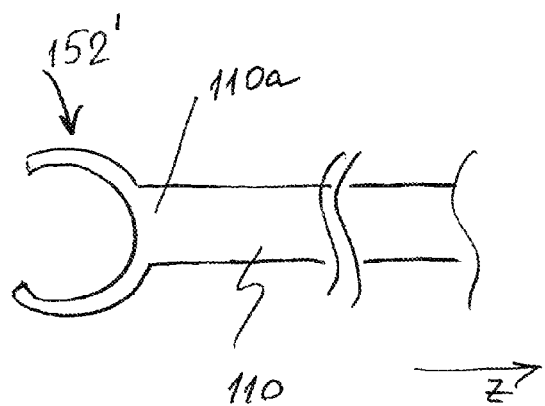
FIG. 2B shows the tubular portion of the embodiment and the steering-wheel cradle being integral with one another.

As shown in FIG. 2A, the foundation portion 204 of the cradle 152 has a tubular shape adapted to internally receive the top tube 110 with a tight radial fit through the opening 206, as shown by an arrow 208. In a specific embodiment, both an end 110a of the section 110 that is inserted into the opening 206 and the opening 206 may be appropriately threaded (not shown) for counterpart connection. In another specific embodiment, the end 110a is slidably and removably inserted into the opening 206. In a related embodiment of FIG. 2B, the cradle 152' is shown in side view to be configured as a part integrally fabricated at the end 110a by, for example, molding. In operation, as described below in more detail, the handle 202 of the cradle 152 is appropriately positioned onto a steering wheel to receive a portion of it.

Figure 2C:
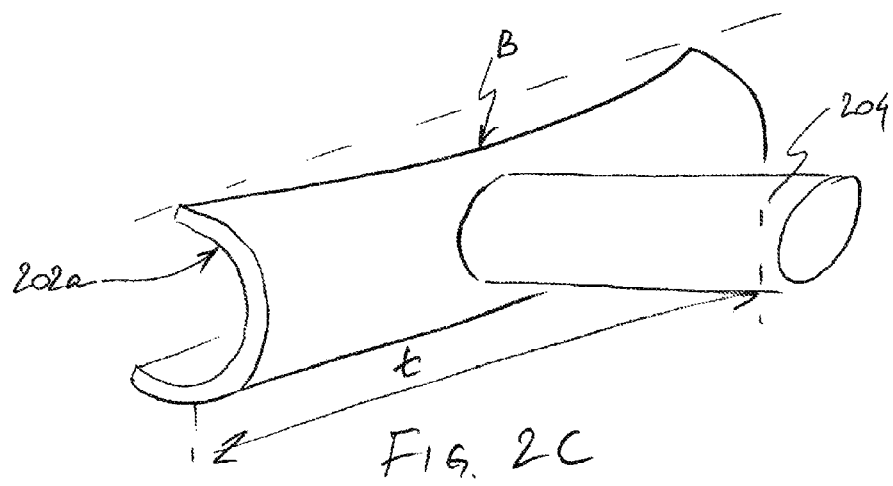
FIG. 2C illustrates an alternative embodiment of the cradle component.
Figure 2D:
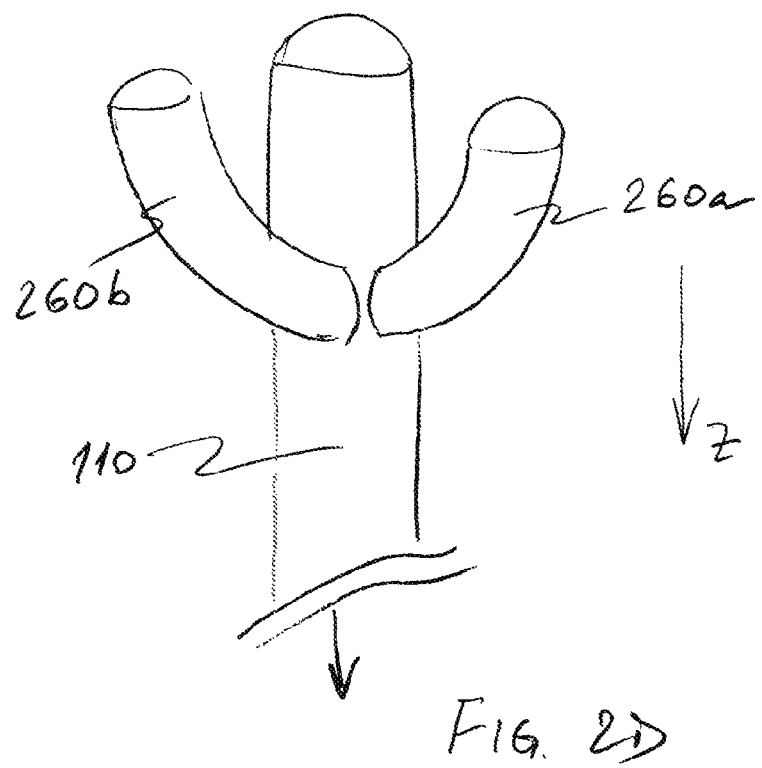
FIG. 2D illustrates another alternative embodiment of the cradle component.

Embodiments of the cradle generally have an extent shown in FIG. 2A as t, which is directed at a predetermined angle with respect to an axis of the foundation portion 204. While the pre-determined angle can generally be defined to be substantially between 60 degrees and 120 degrees, in a specific embodiment, this pre-determined angle of inclination between the handle 202 and the foundation portion 204 is substantially 90 degrees. A peripheral line B defining the transverse extent of the handle 202 may be straight, as shown in FIG. 2A, or curved, as shown in a related embodiment of FIG. 2C. The presence of this curvature along at least one side of the perimeter of the handle 202 addresses facilitates the use of the device with steering wheels of different diameters and cross-sections and may facilitate appropriate accommodation of a given steering wheel by the cradle during the operation of the brake-check device. In yet another alternative embodiment of the device, the cradle may be configured to include at least two forks respectively formed, as schematically shown in FIG. 2D, by braches 260(a,b) stemming from the tubular section 110. In this case the steering wheel in operation is appropriately accommodated by the two forks.

Figure 3:
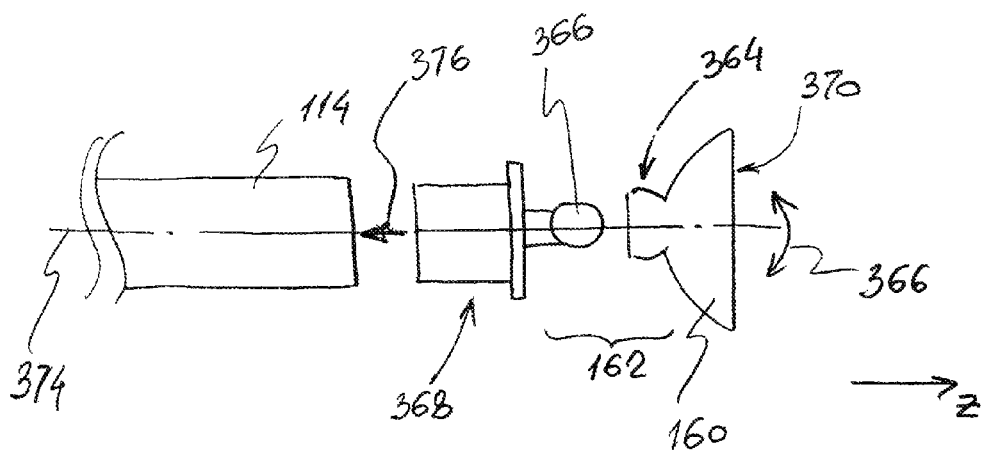
FIG. 3 illustrates a bottom portion of an embodiment of the invention, including a turnable foot rotatably and removably affixed to the bottom tubular portion via a ball-joint.

In reference to the exploded side view of FIG. 3 and in further reference to FIG. 1A, the embodiment 100 is additionally equipped with an adjustable foot 160 that is attached to an end of the bottom section 114 via a ball-joint 162 formed by a ball-socket 364 of the foot 160 and a ball-end 366 of a ball-end cap 368. In one embodiment, the adjustable foot 160 has a planar surface 370 that is distal to the cradle 152 of the device 100 and is judiciously textured to assure a mechanical friction with a brake pedal (not shown) on top of which it is set during the brake-check inspection. In a specific implementation, a patch (not shown) of textured material can be appropriately affixed to the planar surface 370 for this purpose. The ball-socket portion 364 is adapted to allow for a rotatable movement of the foot 160 within a solid angle corresponding to a cone having an apex angle of at least 20 degrees and, preferably, 40 degrees. In other words, the angular range of motion of the foot 160 within the ball-socket is at least +/−10 degrees and, preferably, +/−20 degrees, as shown by an arrow 366, with respect to its resting position. The resting position of the foot 160 is defined when the surface 170 is perpendicular to an axis 374 of the bottom tubular section 114. The ball-end cap 368 may be affixed to the tubular section 114 by, for example, being inserted into an opening (not shown) of the tube 114 along the axis 374 as shown with an arrow 376.

An embodiment 100' of FIG. 1B shows an alternative implementation of a foot of the device accord. Here, the foot 168 is shown to include a plate-like body attached to the lower section 112 of the embodiment 100' either rigidly at a chosen angle A or adjustably and rotatably (by analogy with the embodiment of FIGS. 1A and 3; not shown in FIG. 1B).

Figure 4:
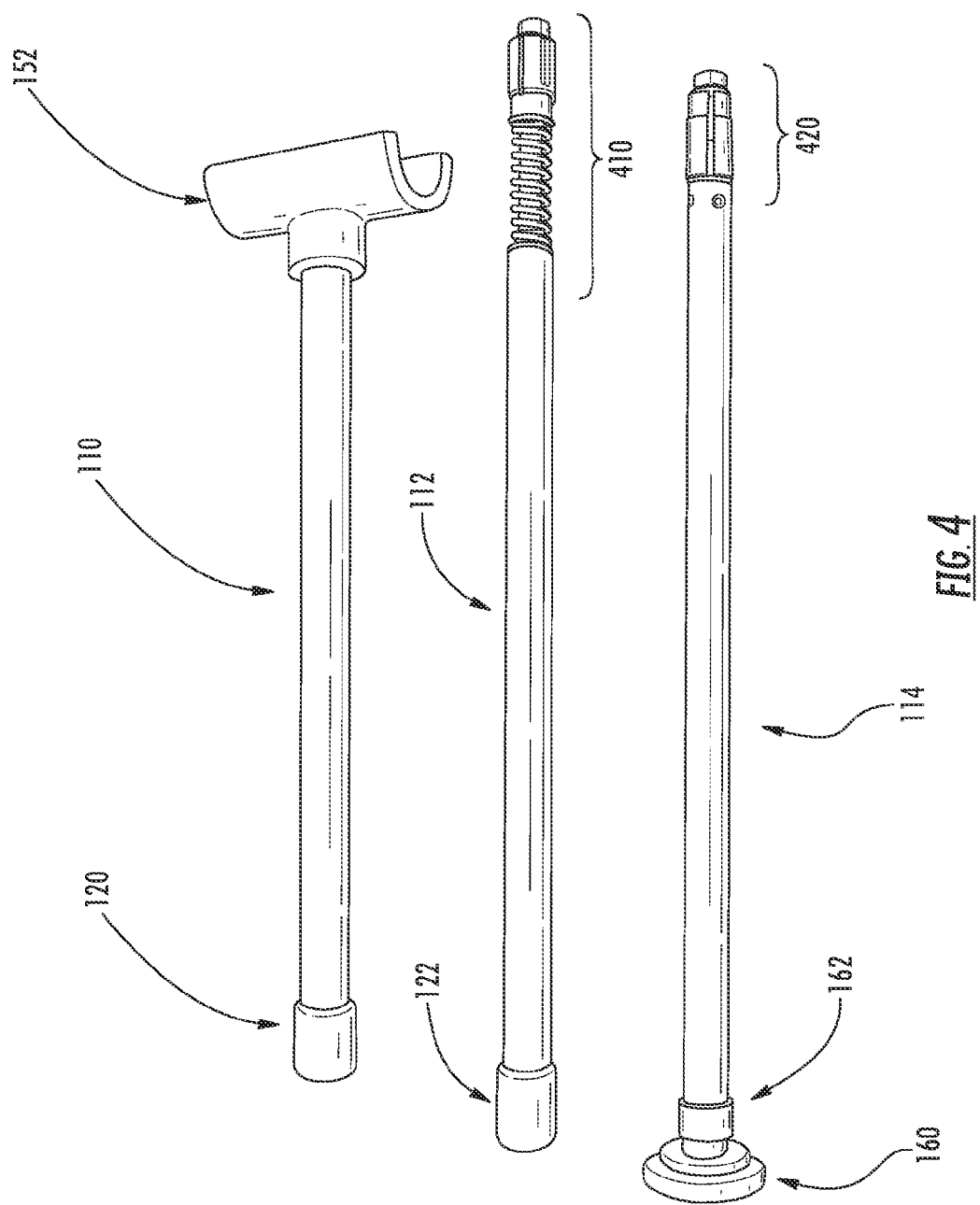
FIG. 4 shows a disassembled embodiment of FIG. 1A.

Referring now to FIGS. 4 through 8, a system for compression and locking of the break-check device is described that facilitates telescopic performance of an embodiment of the device according to the invention. Hereinafter, such system is referred to as a "lock" of the embodiment. FIG. 4 shows the disassembled embodiment 100 of FIG. 1A, where the sections 110, 112, and 114 are displayed side by side, with the steering-wheel cradle 152, the corresponding joint covers 120, 122 and the adjustable foot 160 appropriately affixed thereto. Both the middle section 112 and the bottom section 114 are shown with respectively corresponding locks 410, 420. In a preferred embodiment, the locks 410 and 420 differ in that one of the locks (as shown, the lock 410) includes a component such as a spring adapted to elastically modify the overall length of the brake-check device in response to external force applied to this component, while another lock does not incorporate such a component. In a related embodiment, however, all of the locking mechanisms of the embodiment may include such an elastic component. In an embodiment of the invention, the spring is appropriately chosen to assure that the range of contraction of the spring exceeds at least the radius R of the handle portion of the cradle 152 of the embodiment.

A specific embodiment, presented as a non-limiting example of geometrical proportions of the brake-check device of the invention, may be constructed according to the following specifications:

The tubular section 110: length 12¾"; outer diameter ¾";
The tubular section 112: length 12" (not including threaded shaft with spring); outer diameter ⅝";
The tubular section 114: length 12⅛" (not including the foot 160 and the ball-joint 162); outer diameter ½".
The overall length L=36⅞" (from bottom of the foot 160 to the handle 202 of cradle 152); the fully retracted length of 18⅝";
Dimensions of the cradle 152: 3" long, outer diameter 1⅝", radius of curvature R=⅝";
A cross section of a typical steering wheel: ⅝".

Figure 5:
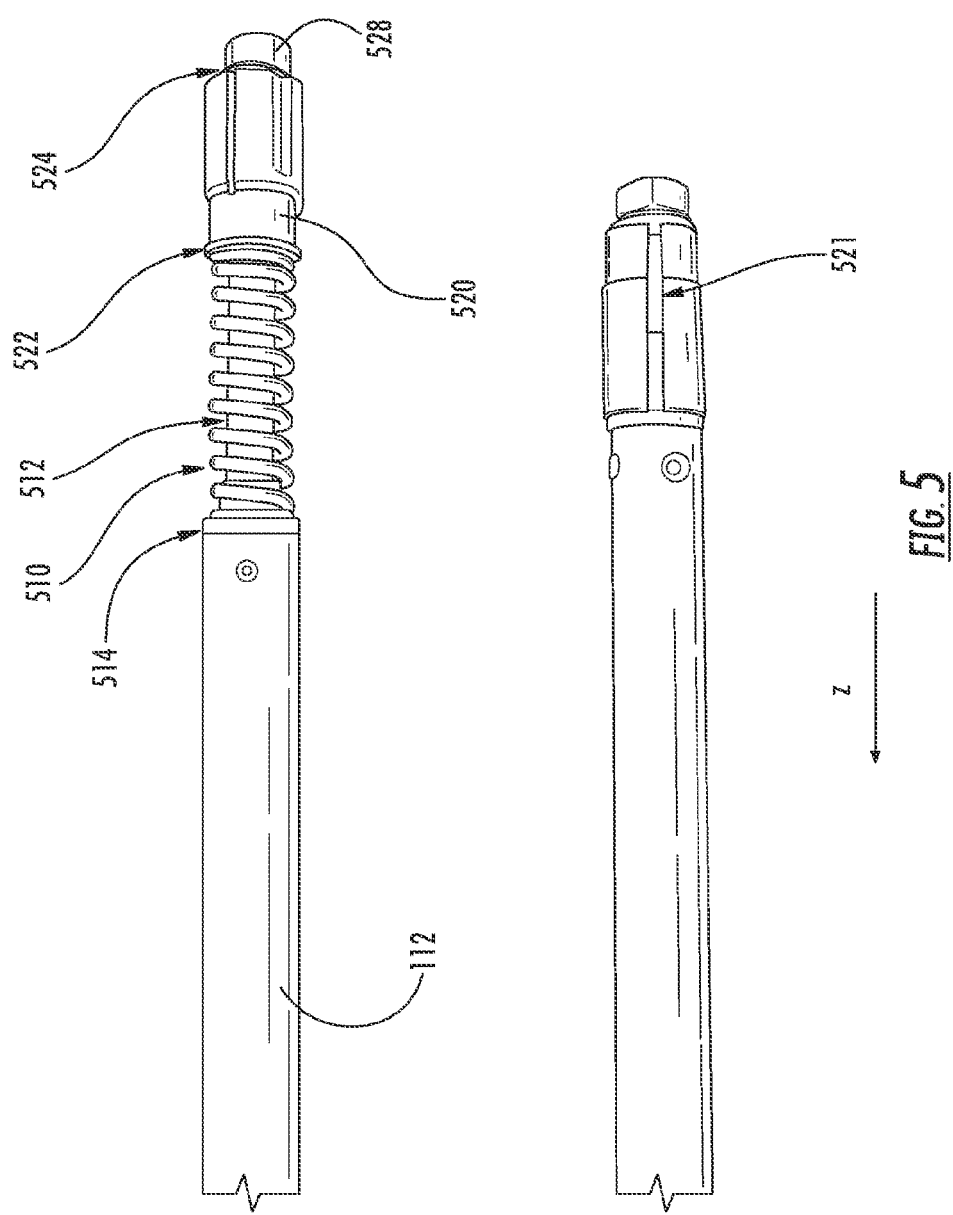
FIG. 5 shows portions of the embodiment of FIG. 1A with exposed locking mechanisms.
Figure 6A:
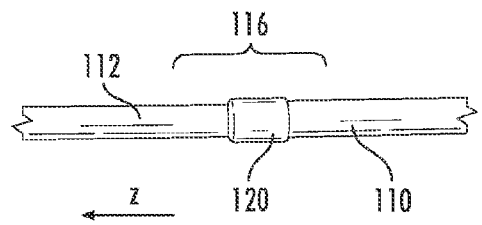
FIG. 6 illustrates the process of assembly/disassembly of a locking mechanism of the embodiment of the invention.
Figure 6B:
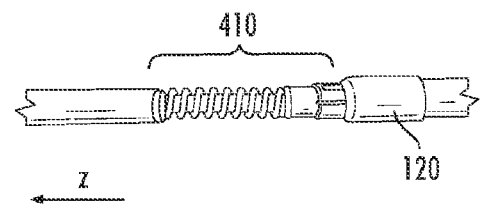
Figure 6C:
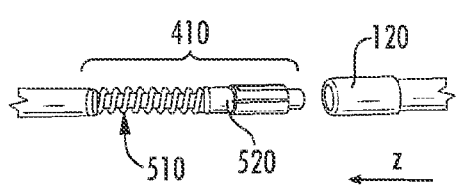
Figure 6D:
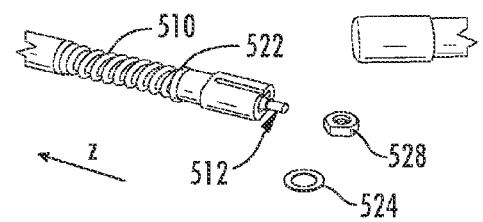
Figure 6E:
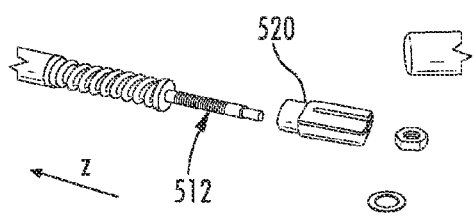
Figure 6F:
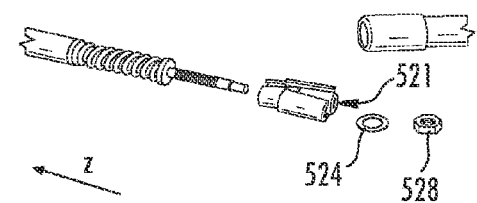
Figure 6G:
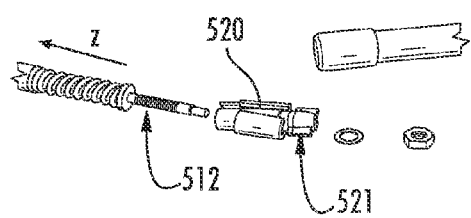
Figure 6H:
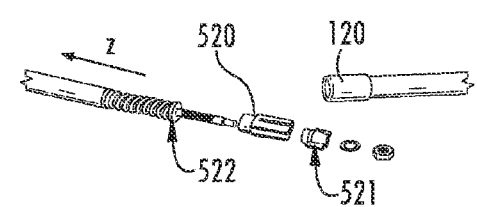

FIG. 5 illustrates an embodiment of a lock in more detail by showing the expanded lock 410 that includes a mechanical spring 510 placed onto a supporting threaded rod or shaft 512 and restricted by a flange 514 of the tubular section 112 at one of its ends. The lock 410 further includes a hollow expander 520, enclosing a center piece (visible as 521 through a cut in the expander 520), that is disposed on the rod 512 coaxially with the spring 510 and that is confined by a washer 522 separating the expander 520 from the spring 510 on one side and a washer 524 providing support for a nut 528 on another side. The nut 528 is screwed down on the rod 512 to hold together the spring 510, the washer 522, the central piece 521 enveloped by the expander 520, and the washer 524. A combination of the washer 522, the expander 520, and a washer 524 can move as a unit along the threaded rod 512 either against the spring 510 or being driven by the spring 510, depending on whether the spring 510 is in an unloaded position or in a compressed position.

A removable attachment between the sections of the embodiment 100 is illustrated in FIGS. 6(A-H). In their adjoined position, as shown in FIG. 6A, the sections 110 and 112 are connected through the joint portion 116 that encloses the lock 410 inside the portion 116. To open up the joint portion 116 in order to loosen the lock 410 and move apart or even completely separate the sections 110 and 112, the sections 110, 112 are mutually twisted around a common axis (z-axis in FIG. 6A) that de-activates the lock 410, as described below, and are pulled apart thereby exposing the lock 410, as shown in FIGS. 6(B, C). The lock 410 can be further disassembled by unscrewing and removing the nut 528 (FIG. 6D), and taking at least the washer 524, the expander 520, and the central piece 510 off the threaded rod 512, FIGS. 6(D-H). In a similar fashion, a second lock of the embodiment 100 of FIG. 1A, the lock 410, can be taken apart.

A performance of the lock of an embodiment of the invention includes cooperation among a threaded rod, a central piece, and an expander of a first tubular section of the embodiment to which these components are attached and a neighboring second section that envelopes the expander. For example, starting in a position when the neighboring tubular sections of the device are slidable along one another so as to allow for telescopic change of the length of the device, these neighboring sections can be mutually twisted around their common axis in such a fashion as to cause one tubular section rotate around the common axis with respect to a neighboring tubular section. The twisting motion is transferred, through a threading on the rod, to a longitudinal motion of the center piece along the threaded rod and with respect to and inside the expander. The movement of the center piece inside the hollow of the expander activates the expander by forcing a portion of the expander to move radially and outwardly with respect to the threaded rod thereby increasing the friction between the outer surface of the expander and the inner surface of a tubular section that encloses the expander. The increase of friction reduces and eliminates the movement of the neighboring sections with respect to one another thereby mutually fastening the sections and securing the instantaneous length of the device. It is understood that, starting in the locked position, the twisting of the corresponding tubular sections in opposite direction reverses the chain of events described above and loosens the lock, thus allowing for a telescopic expansion or contraction of the break-check device.

Figure 7D:
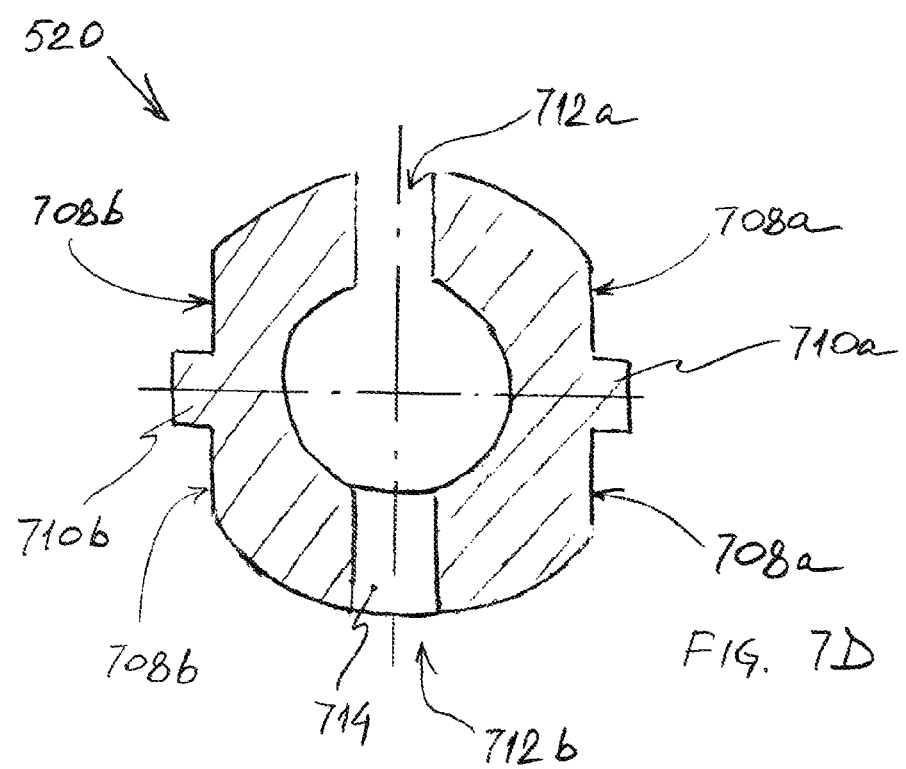
FIGS. 7(A-D) show, in several views, an expander of a lock of the invention.

The expander 520 of a lock is shown in various views of FIGS. 7(A-D). The expander 520 has a hollow body 702 with a generally cylindrical outside surface and a generally conical inside surface. The expander 520 is shown in FIG. 7A to include two main portions 704 and 706 that have corresponding outer diameters $D_{exp1}$ and $D_{exp2}$. The diameters of the ends of the internal conical channel 707 are not indicated on the drawing. The body 702 is made of a resilient material, for example molded from plastic. While in the embodiment 520 $D_{exp1} < D_{exp2}$, in a related embodiment these outer diameters may be made equal. In case where the outer diameters $D_{exp1}$ and $D_{exp2}$ are not equal, the largest of these diameters is chosen such that the embodiment of the expander 520 fits inside a corresponding tubular section into which this expander is inserted during the operation of the brake-check device.

In a preferred embodiment, the body of the expander is shaped in such a fashion as to have at least one facet formed on the outer surface of the body and at least one fin outwardly protruding from the outer surface of the body. It is understood that in an embodiment having several facets and several corresponding fins, such facets are generally distributed along the circumference of the body of the expander in any spatial relationships with one another. For example, in the specific embodiment 520 of FIGS. 7(A-D), the portion 706 of the body 702 is shown to contain two facets 708(a,b) on the diametrically opposite sides of the body and fins 710(a,b) protruding externally with respect to the facets 708(a,b). In addition, the embodiment 520 has two diametrically opposed slit-like openings or cuts-through 712a, 712b along the body of the expander. One opening, 712a, is a complete cut through the whole length of the body of the expander, while the second opening, 712b, is shown to be incomplete in that a bridge 714 of material remains to assure a single-piece integrity of the expander during the operation, as described below. It is understood that, in a specific embodiment, the inside surface of the expander 520 may be cylindrical, which does not change the principle of operation of the lock of the invention.

Figure 8A:
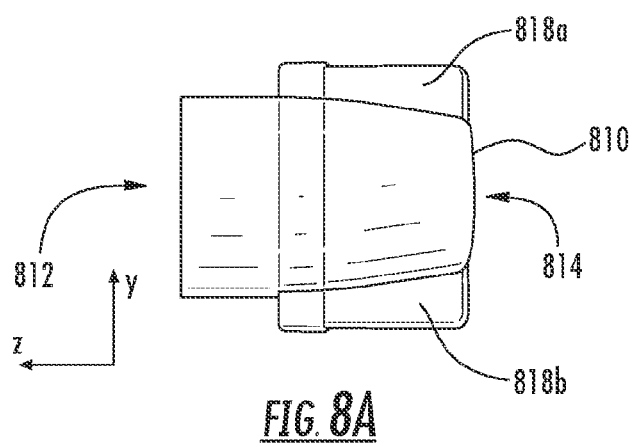
FIGS. 8(A-C) show, in several views, a center piece of a lock of the invention cooperating, in operation, with the expander of FIGS. 7(A-D).
Figure 8B:
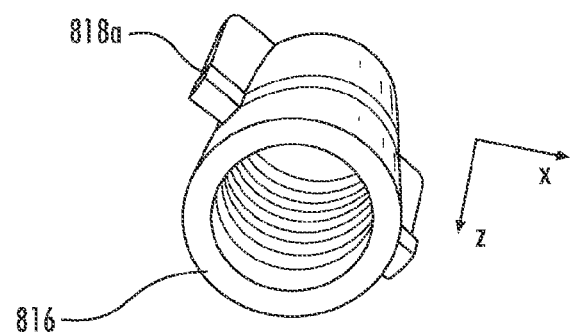
Figure 8C:
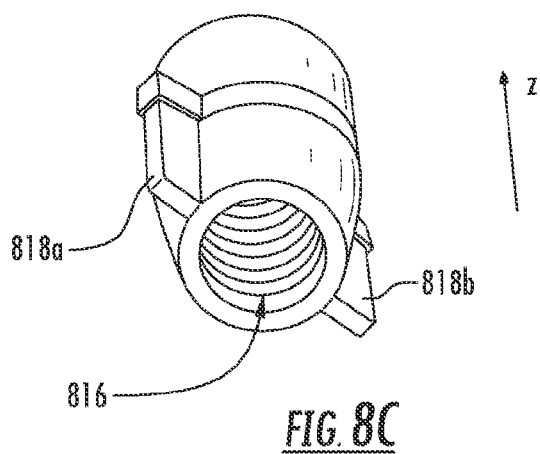

The center piece 521, as illustrated in FIG. 8(A-C), has a body 810 having a generally conical shape and a cylindrically-shaped channel or furrow throughout the body 810 with openings 812 and 814 at the opposite side of the body 810. The throughout inside furrow of the body 810 is appropriately threaded, 816, to allow for thread-mating of the center piece 521 with the shaft 512 of FIG. 5. The outside surface of the body 810 has protruding stabilizers the number of which is equal to the number of cut-through slits of the expander of the embodiment. In reference to FIGS. 7(A-D) and 8(A-C), there are shown two stabilizers, 818a and 818b, of the center piece 521 that respectively correspond to the slits 712a and 712b of the expander 520.

In operation, and in further reference to FIGS. 5 through 8, a mechanism of a telescopic adjustment of the overall length of the embodiment of the brake-check device of the invention is described. Using the sections 110 and 112 as an example, the center piece 521 is threaded onto the shaft 512 on top of the coil spring 510 so as to point the opening 814 corresponding to the to apex portion of the conical body 521 towards the open end of the shaft 512. Then the expander 520 is set onto the center piece 521 in such a fashion as to place the conical hollow 707 of the expander 520 along and in the same orientation as the conical body 810 of the center piece 521. In doing so, the stabilizers 818(a,b) of the center piece 521 are inserted in the slits 712(a,b), of the expander 520, that serve as guides or rails for the stabilizers. Once the combination of the expander and the center piece is constrained on the shaft with the washer 524 and the nut 528, thus completing the assembly of a lock, the lock portion of the first tubular section (such as the middle section 112) is inserted into a responding tubular section (such as the top section 110, under the joint cover 120) at an appropriate depth that defines the overall aggregate length of a piece of the brake-check device formed by the two sections 110, 112. At this point, mutual twisting of the sections 110 and 112 translates into a rotational motion of the shaft 512 with respect to the center piece 521 and, through the thread 816, into a longitudinal repositioning of the center piece 521 along the shaft 512. Depending on the direction of the twisting motion, the twisting motion causes, therefore, the center piece 521 that is guided by the slits 712(a,b) to move either into or out of the conical inside 707 of the expander 520. When the conical center piece moves deeper inside the conical hollow of the expander (in a −z direction), the center piece pushes radially and outwardly the two halves of the expander defined by the slits 712(a,b) thereby increasing the diameter $D_{exp2}$ and bringing the fins 710(a,b) into such physical contact with the inside of the tubular section 110 that substantially prevents the expander and the section 112 from any further movement inside the section 110. As a result, the instantaneous aggregate length of the piece formed by the sections 110, 112 is fixed. When the length has to be adjusted again, the user mutually twists the sections in the opposite directions thus forcing the stabilizers 818(a,b) of the center piece 521 to move along the slits 712(a,b) in the opposite direction (+z direction) and relieve the pressure created by the fins 710(a,b) from inside and onto the section 110 and allow, again, for a sliding motion of the lock 410 and the section 112 inside the section 110. The mutual telescopic adjustment of the sections 112 and 114 is performed in a substantially analogous fashion.

Figure 9A:
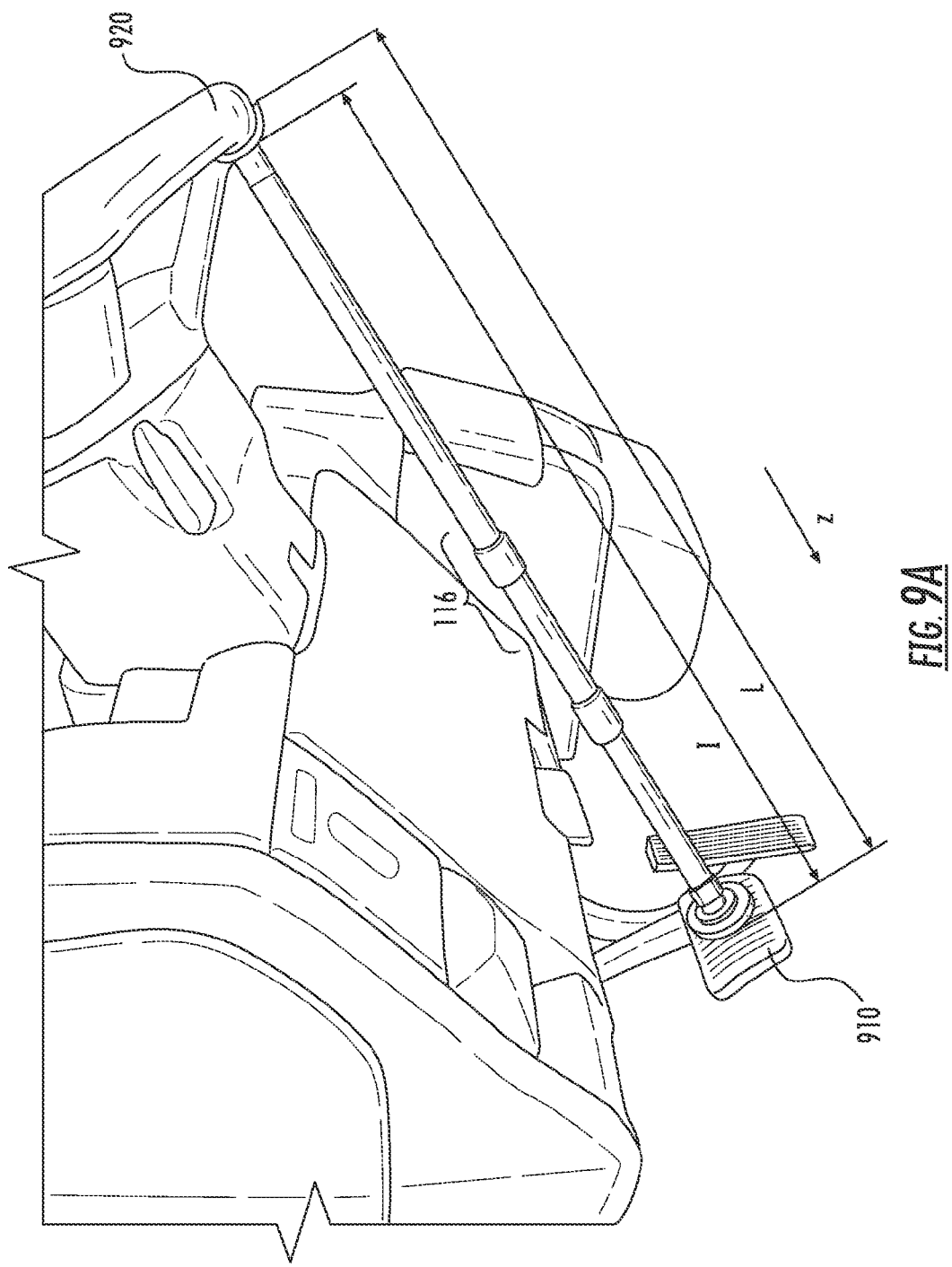
FIGS. 9(A-C) show, in several views, the embodiment of FIG. 1A in operation as being inserted between a steering wheel and a brake pedal of a car, thereby fixing the mutual positioning of and the distance between the steering wheel and the brake pedal.
Figure 9B:
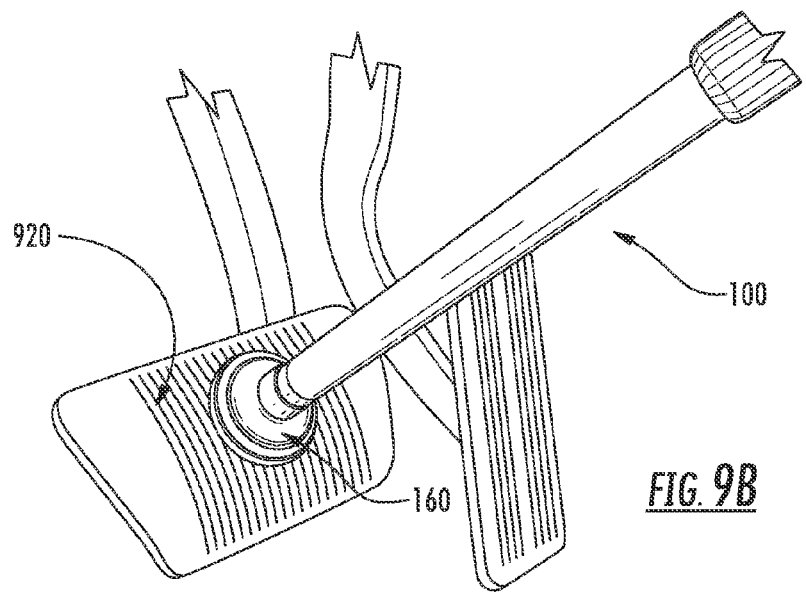
Figure 9C:
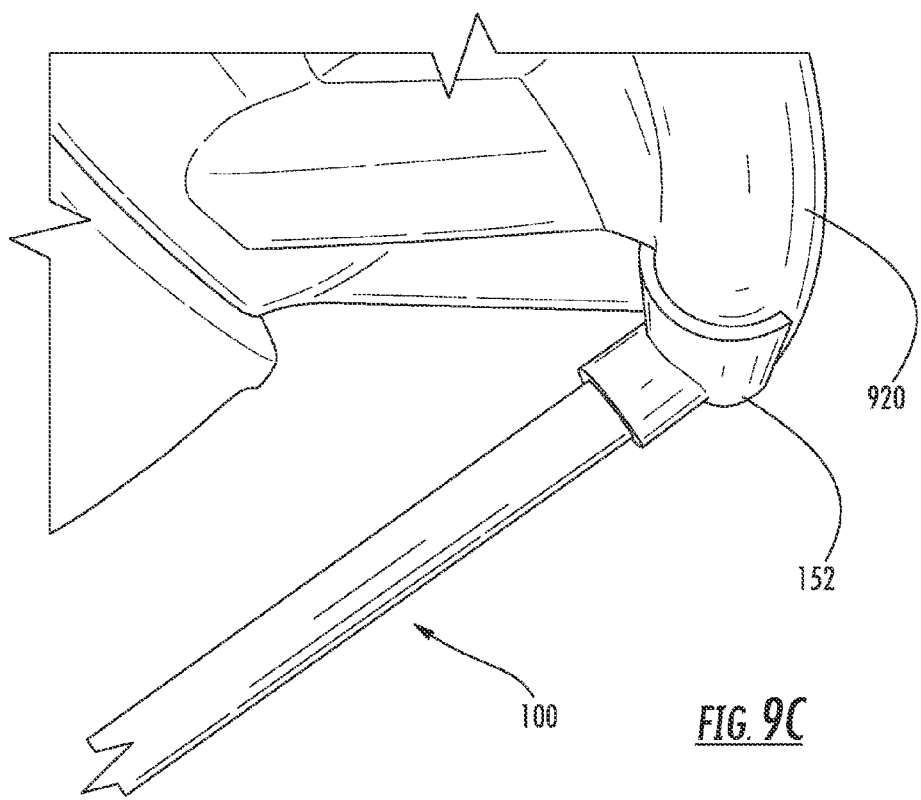

It will be understood by a skilled artisan that a spring, such as the spring 510 inside one of the locks (for example, the lock 410) of the embodiment of the brake-check device, facilitates the installment of the device for operation in the vehicular cabin. In operation and in reference to FIGS. 9(A-C), during the installation of the brake-check device between the brake pedal 910 and the steering wheel 920 of a chosen car, the embodiment of the device (for example, the embodiment 100 of FIGS. 1A and 4) is telescopically extended, by manipulating the locks 410, 420, to lengthen the embodiment slightly beyond the linear distance l separating the brake pedal and the steering wheel of the car. For example, the device 100 is extended and locked to assure that the linear extent L of FIG. 1A visually appears to be substantially equal to l. The overall length of the embodiment in such a case will exceed the separation between the brake pedal and the steering wheel of the car by at least R. To insert the extended device between the pedal 910 and the wheel 910, the user then places the foot 160 of the embodiment on the brake pedal, applies a compression force along the length of the device (in +z direction) to contract the spring of the lock 410 under the joint cover 116, and slips the cradle 152 from under and onto the steering wheel 920. The ball joint 162, turnable or rotatable within specified spatial angular limits, appropriately accommodates the angular deviation between the axis of the device and the brake pedal. The embodiment 100 of the device is then held in place, and is prevented from accidental removal from, between the steering wheel and the brake pedal by the extension force created by a compressed spring 510 of the lock 410. After installation of the device, the mutual positioning of the steering wheel and the brake pedal is fixed by the installed device.

Referring now to FIGS. 10(A, B), partially showing a specific embodiment 1000 of the present invention, a feedback system for use with the specific embodiment 1000 is described. As shown, the feedback system includes a light emitter such as an LED 1002 and an embodiment 1052 of the steering-wheel cradle having a button-like or, alternatively, a piston-like trigger 1054 protruding from and above the inner surface 202a inwardly towards the center of curvature of the surface 202a. The light emitter is activated with a use of an electrical circuit such as, for example, a circuit 1060 of FIG. 10B or any other appropriate circuit. The circuit of FIG. 10B is shown to be electrically closed with the switch S1 activated by the trigger 1054 when the brake-check device 100 is set in its operational position between the steering wheel 920 and the brake pedal 910. As described in reference to FIGS. 9(A-C), when the device is appropriately positioned, a portion of the steering wheel is housed within the handle 202 of the cradle 1052 so as to establish a firm physical contact between the inner surface 202a of the handle, to depress the trigger 1054, and to simultaneously prevent the accidental removal of the embodiment 1000 from this operational position. Achieving a direct physical contact between the surface of the steering wheel and the surface 202a results in depressing of the trigger 1054. The depressed trigger 1054 activates a switch S1 of the circuitry of FIG. 10B, thereby turning on the LED 1002 and optically indicating to the driver that the embodiment of the brake-check device is in locked operational position. The user can now leave the vehicular cabin to observe the operation of the vehicular brake system from outside.

In accordance with an exemplary embodiment, a device and a method for checking the operability of a vehicular break system are provided. While specific values chosen for these embodiments are recited, it is to be understood that, within the scope of the invention, the values of some or all of geometrical parameters may vary over wide ranges to suit different applications.

While the invention is described through the above-described exemplary embodiments, it will be understood by those of ordinary skill in the art that modifications to, and variations of, the illustrated embodiments may be made without departing from the inventive concepts disclosed herein. For example, if required, at least one of the tubular sections of an embodiment may be appropriately curved (or bent) thereby forming an angle with respect to the remaining portion of the embodiment. In addition or alternatively, an embodiment of the cradle of the invention may comprise a block or a thick layer of a cushy material such as rubber that facilitates the fixation of the cradle on the steering wheel. In yet another related embodiment, the handle of the cradle may be shaped as a "Y" formed by two adjoining plates disposed as a dihedral angle. In an embodiment equipped with an alternative implementation of the optical feedback mechanism, for example, the cradle 152 may be appropriately configured without a separate trigger such as the trigger 1054 of FIG. 10. In this alternative embodiment the cradle 152 may be made slide, with its foundation portion 204, along the section 110 so as to have the handle portion 202 activate the switch S1 of the circuit 1060 internally to the section 110. In a related embodiment, the feedback system of the invention may include an acoustic source (in addition or as an alternative to the LED) and produce an audible signal (in response to the feedback-system trigger being depressed) that is perceived by the user. Furthermore, disclosed aspects, or portions of these aspects, may be combined in ways not listed above. Accordingly, the invention should not be viewed as being limited to the disclosed embodiment(s).

What is claimed is:

1. A vehicular brake pedal fixator comprising:
    first and second sections slidably cooperating to form a unit configured to have a length that is telescopically adjustable;
    a cylindrical cover element disposed around a joint formed at a junction between the first and second sections such as to cover said joint;
    a cradle having a foundation,
        a semi-cylindrical channel with a depth, and
        an extent that is larger than the depth,
            the foundation extending transversely with respect to the extent, the cradle being attached to the first section so as to have the extent
    directed transversely with respect to the telescopically adjustable length; and
    a support attached to the second section through a turnably regulatable joint, wherein the cradle and support define ends of the unit,
wherein at least one of the first and second sections has
    a lock moveably attached to an end of the at least one of the first and second sections, the lock including a tubular expander having an axial hollow, and
    a central tubular piece partially positioned within the hollow, the central tubular piece being movable inside the hollow to force a portion of the tubular expander outward from an axis of the at least one of the first and second sections in response to an axial rotation of one of the at least one of the first and second section with respect to another such as to fix the telescopically adjustable length.

2. A fixator according to claim 1, wherein the first and second sections are tubular, wherein the foundation is tubular and has an opening therein, and wherein an end of the first tubular section is internally received with a tight radial fit by the tubular foundation through the opening.

3. A fixator according to claim 1, wherein the first and second sections are adjoining.

4. A fixator according to claim 1, wherein the cradle is repositionable with respect to the first section.

5. A fixator according to claim 1, further including a rod axially juxtaposed at the end of the at least one of the first and second sections, wherein the central tubular piece is threaded onto the rod.

6. A fixator according to claim 1, further comprising a compression spring housed in at least one of the first and second sections, and wherein the unit is further configured to have a length that is reducible against a resistance force created by the compression spring.

7. A fixator according to claim 1, further comprising a feedback system having a trigger, the feedback system configured to provide a user-perceived output in response to the trigger being activated.

8. A fixator according to claim 7, wherein the output includes at least one of an audible signal and a visually perceivable signal.

9. A fixator according to claim 7, wherein the trigger is configured to be activated in response to the fixator being positioned between a steering wheel and a brake pedal of the vehicle such that the channel receives a portion of the steering wheel and the foot depresses the brake pedal.

10. A fixator according to claim 7, wherein the trigger is incorporated in the cradle in cooperation with an internal surface of the channel.

11. A fixator according to claim 1, wherein the cylindrical element is chosen from the group consisting of a joint cover adapted to accommodate an end of at least one of the first and second sections in a hollow thereof and an intermediate section.

12. A fixator according to claim 1, wherein a peripheral line defining the extent is curved to accommodate, in operation of the fixator, steering wheels of different dimensions in the channel of the cradle.

13. A vehicular brake pedal fixator comprising:
    a cylindrical element;
    first and second tubular sections slidably cooperating through the cylindrical element to form a unit configured to have a length that is adjustable;
    a cradle having a channel with a shape of an incomplete cylinder, a depth, and longitudinal extent that is larger than the depth, the cradle being attached to the first section so as to have the extent directed transversely with respect to the telescopically adjustable length;
    a support attached to the second section through a turnably regulatable joint,
    wherein at least one of the first and second sections includes a lock moveably attached to an end of one of the at least one of the first and second sections and unperceivably housed inside another of the at least one of the first and second sections, the lock having a tubular expander with an axial hollow and first and second slits along a portion of a length thereof, a portion of the tubular expander being movable outwardly with respect to the axial hollow such as to increase a diameter of a portion of the expander defined by the first and second slits inside an adjacent tubular section in response to a movement of the lock along the at least one of the first and second sections.

14. A fixator according to claim 13, wherein a portion of the lock is threaded at the end of at least one of the first and second sections to enable a telescopic adjustment of the adjustable length by fastening an end of the at least one of the first and second sections inside the adjacent tubular section.

15. A fixator according to claim 13, wherein the lock includes a central piece having
    a conically shaped end; and
    an outwardly-protruding first and second fins;
    the conically shaped end being dimensioned, in response to a twisting motion of one of the first and second sections about an axis with respect to another of the first and second section, to axially move inside the hollow of the tubular expander with the first and second fin sliding, respectively, along the first and second slits to cause the portion of the tubular expander to move radially and outwardly with respect to the hollow inside the adjacent tubular section such as to increase friction between an outer surface of the tubular expander and an inner surface of a tubular section that encloses the expander to fix the adjustable length.

16. A fixator according to claim 13, wherein the cylindrical element is chosen from the group consisting of a joint cover adapted to accommodate an end of at least one of the first and second sections in a hollow thereof, and an intermediate section that is slidable with respect to the at least one of the first and second sections, and wherein the cylindrical element and the first and second sections are substantially co-axial.

17. A fixator according to claim 13, further comprising a feedback system having a trigger, the trigger being actuatable in response to the fixator being positioned between a steering wheel and a brake pedal of the vehicle such that the channel receives a portion of the steering wheel and the support depresses the brake pedal, the feedback system being enabled to generate a user-perceivable output in response of the trigger's being actuated.

* * * * *